United States Patent [19]
Tosa et al.

[11] Patent Number: 5,888,457
[45] Date of Patent: *Mar. 30, 1999

[54] CATALYTIC CONVERTER

[75] Inventors: Shinichi Tosa; Kouichi Fujimori, both of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 728,476

[22] Filed: Oct. 10, 1996

[30] Foreign Application Priority Data

Oct. 16, 1995 [JP] Japan ................................ 7-267411

[51] Int. Cl.$^6$ ........................................... B01D 53/34
[52] U.S. Cl. ..................... 422/179; 422/177; 422/180; 422/221; 422/222; 60/299
[58] Field of Search ....................................... 422/171, 177, 422/179, 180, 211, 221, 222; 60/299; 502/439, 527; 428/116, 593, 594; 29/890

[56] References Cited

U.S. PATENT DOCUMENTS

| | | | |
|---|---|---|---|
| 4,322,388 | 3/1982 | Hardin et al. | 422/177 |
| 5,055,274 | 10/1991 | Abbott | 422/179 |
| 5,207,989 | 5/1993 | MacNeil | 422/179 |
| 5,273,724 | 12/1993 | Bos | 422/179 |
| 5,501,842 | 3/1996 | Rajnik et al. | 422/179 |

*Primary Examiner*—Hein Tran
*Attorney, Agent, or Firm*—Armstrong, Westerman, Hattori, McLeland & Naughton

[57] ABSTRACT

A catalytic converter including a cylindrical catalyst carrier having a catalyst carried therein, a retaining mat wound around an outer peripheral surface of the catalyst carrier, and a casing including a cylindrical carrier retaining portion for retaining the catalyst carrier with the retaining mat compressed. The cylindrical carrier retaining portion is an assembly which is constructed of diametrically split halves whose axially extending opposite-side edges are fitted over each other with fitted portions bonded to each other. The cylindrical carrier retaining portion has an oval cross-sectional shape with a longer diameter between both the fitted portions. Thus, the density of the retaining mat in the circumferential direction of the catalyst carrier after being compressed can be varied in an increased manner to compensate for the decreasing variation in urging force provided by the cylindrical carrier retaining portion. Thus, it is possible to decrease the non-uniform degree of the surface pressure applied to the catalyst carrier by the cylindrical carrier retaining portion.

6 Claims, 9 Drawing Sheets

CATALYTIC CONVERTER

BACKGROUND OF THE INVENTION

1. Field of the Invention

The present invention relates to a catalytic converter comprising: a cylindrical catalyst carrier having a catalyst carried therein, a retaining mat wound around an outer peripheral surface of the catalyst carrier, and a casing including a cylindrical carrier retaining portion for retaining the catalyst carrier in a state in which the retaining mat is compressed. The cylindrical carrier retaining portion is an assembly which includes diametrically split halves whose axially extending opposite-side edges are fitted over each other with fitted portions thereof bonded to each other.

2. Description of the Related Art

In a conventional type of catalytic converter, the cylindrical carrier retaining portion of the casing is formed to have a cross-section with a true circular shape.

In making a catalytic converter, the following processes are employed: (1) one of the halves is retained on a lower mounting member with its opposite-side edges turned upwards; (2) the catalyst carrier with the retaining unit wound around the carrier is placed between the opposite-side edges; (3) an upper mounting member retaining the other half with its opposite-side edges turned downwards is lowered; the catalyst carrier is clamped by both the halves with the retaining mat compressed, therebetween and the opposite-side edges of the other half are fitted over the opposite-side edges of the one half, (4) both the fitted portions are bonded to each other by a means such as welding.

In this case, the urging force provided in a direction toward the center of the catalyst carrier by the cylindrical carrier retaining portion is largest at a circumferentially bisecting position in each of the halves; is relatively sharply decreased from the bisecting position toward the fitted portions; and is approximately zero at the fitted portions.

Therefore, to make uniform the surface pressure on the catalyst carrier over an area from the circumferentially bisecting position in each of the halves to the fitted portions to increase the retaining force applied to the catalyst carrier by the cylindrical carrier retaining portion, it is required that the density of the retaining mat after compression assume a predetermined value at the circumferentially bisecting position in accordance with the urging force, and is increasingly varied from the circumferentially bisecting position to both the fitted portions in accordance with the decreasing variation of the urging force so as to provide compensation.

In the prior art, however, because each of the halves has an arcuate inner peripheral surface, the amount of opposite-side edges of each half biting into the outer peripheral surface of the retaining mat and the frictional force of the inner peripheral surface of each half to the outer peripheral surface of the retaining mat are greater in the course of clamping of the catalyst carrier by both the halves and hence, the retaining mat is excessively drawn in a circumferential direction.

As a result, the density of the retaining mat after being compressed is low at the circumferentially bisecting position in each of the halves and is extremely high in the vicinity of both the fitted portions.

Because of this, the non-uniform degree of the surface pressure on the catalyst carrier in the circumferential direction thereof (excluding areas corresponding to both the fitted portions and this will also be applied hereinafter) is increased in such a manner that the surface pressure is extremely low at the circumferentially bisecting position in each of the halves and is extremely high in the vicinity of both the fitted portions. This causes a reduction in retaining force applied to the catalyst carrier by the cylindrical carrier retaining portion.

SUMMARY OF THE INVENTION

Accordingly, it is an object of the present invention to provide a catalytic converter of the above-described type, wherein the non-uniform degree of the surface pressure on the catalyst carrier in the circumferential direction thereof can be decreased by specifying the shape of the cylindrical carrier retaining portion in the casing, thereby increasing the retaining force applied to the catalyst carrier by the cylindrical carrier retaining portion.

To achieve the above object, according to the present invention, there is provided a catalytic converter comprising: a cylindrical catalyst carrier having a catalyst carried therein, a retaining mat wound around an outer peripheral surface of the catalyst carrier, and a casing including a cylindrical carrier retaining portion for retaining the catalyst carrier in a state in which the retaining mat is compressed, the cylindrical carrier retaining portion being an assembly which includes diametrically split halves whose axially extending opposite-side edges are fitted over each other with fitted portions thereof bonded to each other, wherein the cylindrical carrier retaining portion has an oval cross-sectional shape in which a length between both the fitted portions is the longest diameter.

If the cross-sectional shape of the cylindrical carrier retaining portion is specified as described above, the distance between the opposite-side edges of each of the halves can be increased more than the situation where each half has an arcuate inner peripheral surface, and the inner surface of each half can be made smooth. Thus, in the course of clamping the catalyst carrier by both the halves, the amount of opposite-side edges of each half biting into the outer peripheral surface of the retaining mat can be decreased, and the frictional force of the inner peripheral surface of each half to the outer peripheral surface of the retaining mat can be decreased, thereby moderating the drawing of the retaining mat.

As a result, the density of the retaining mat after being compressed is greater at the circumferentially bisecting position than that in the prior art and is increasingly varied in accordance with the decreasing variation in urging force so as to provide compensation.

Thus, it is possible to decrease the non-uniform degree of the surface pressure on the catalyst carrier in the circumferential direction thereof and to increase the retaining force applied to the catalyst carrier by the cylindrical carrier retaining portion.

In addition, according to the present invention, there is provided a catalytic converter comprising: a cylindrical catalyst carrier having a catalyst carried therein, a retaining mat wound around an outer peripheral surface of the catalyst carrier, and a casing including a cylindrical carrier retaining portion for retaining the catalyst carrier in a state in which the retaining mat is compressed, the cylindrical carrier retaining portion being an assembly which includes diametrically split halves whose axially extending opposite-side edges are fitted over each other with fitted portions thereof bonded to each other. Each of the halves includes a first constructing section which includes a circumferentially bisecting position in each of the halves between the opposite-side edges and has a single circular arc, and a pair of second construction sections which lie between opposite ends of the first constructing section and the opposite-side edges and each of which has at least one circular arc bulging radially outwards to a larger extent than the first constructing section.

If the shape of each of the halves is specified as described above, in the course of clamping the catalyst carrier by both the halves, the friction of the inner peripheral surface of each of the second constructing sections to the outer peripheral surface of the retaining mat can be further decreased to further moderate the drawing of the retaining mat. In addition, each of the second constructing sections lies in an area where the amount of the retaining mat is increased due to such drawing and hence, the increment portions can be contained in the second constructing sections.

Thus, the density of the retaining mat after being compressed is greater than that in the prior art and is varied in an increased manner over an area from the circumferentially bisecting position to both the fitted portions in accordance with the decreasing variation in urging force so as to provide satisfactory compensation. Therefore, it is possible to further decrease the non-uniform degree of the surface pressure on the catalyst carrier in the circumferential direction thereof and to further increase the retaining force applied to the catalyst carrier by the cylindrical carrier retaining portion.

The above and other objects, features and advantages of the invention will become apparent from the following description of the preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

Figure 1:
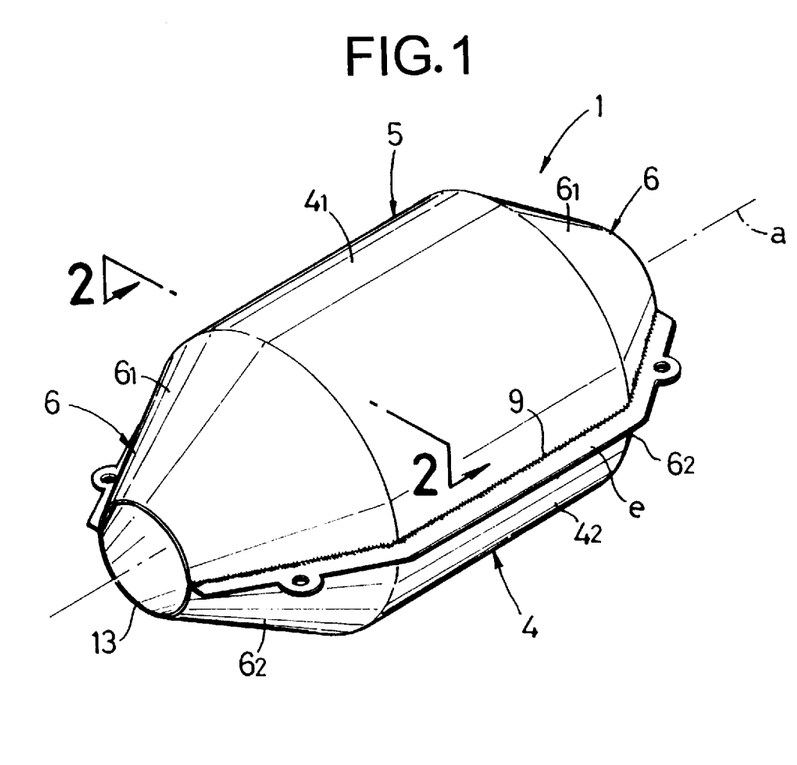
FIG. 1 is a perspective view of a catalytic converter according to a first embodiment of the present invention.
Figure 2:
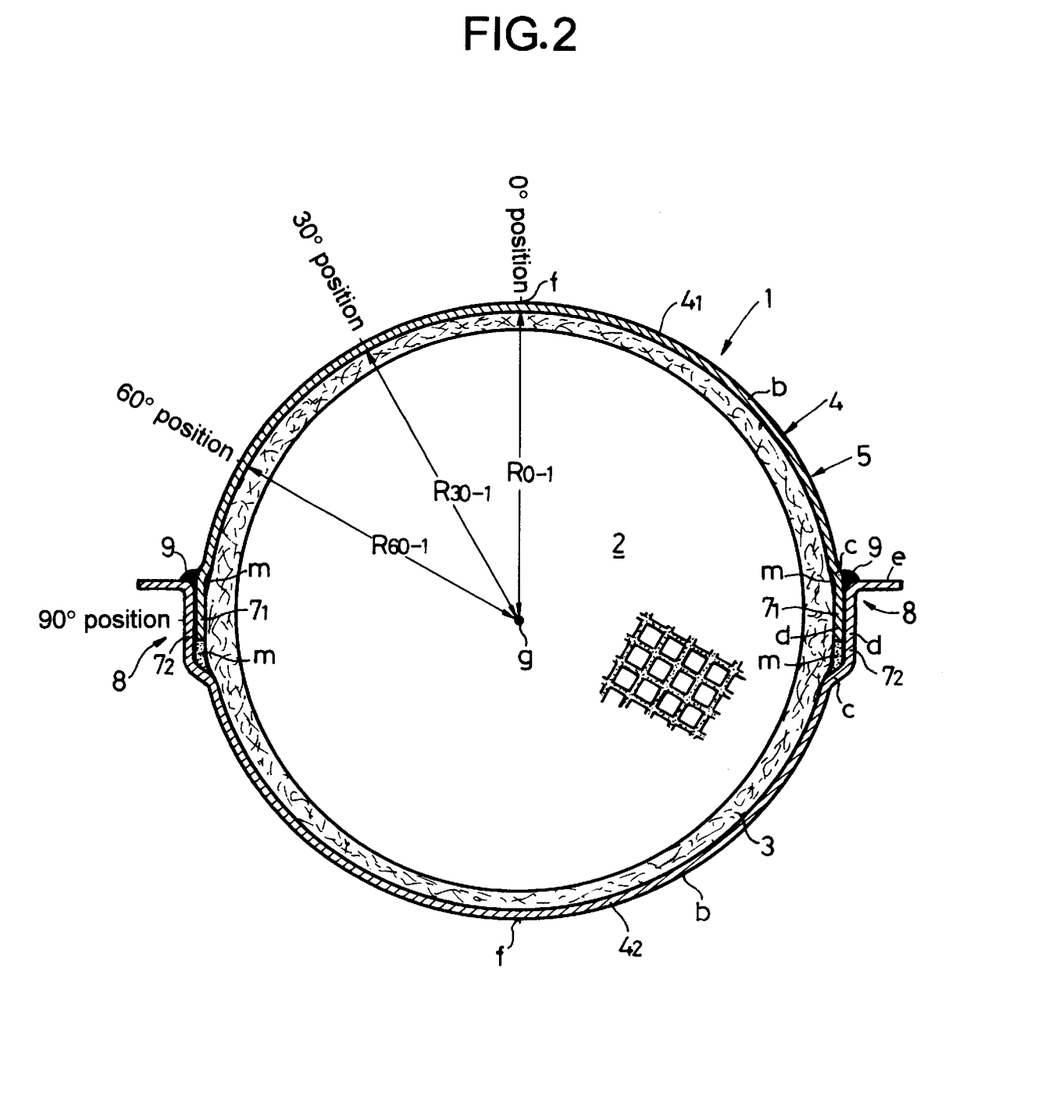
FIG. 2 is a sectional view taken along the line 2—2 in FIG. 1.
Figure 3:
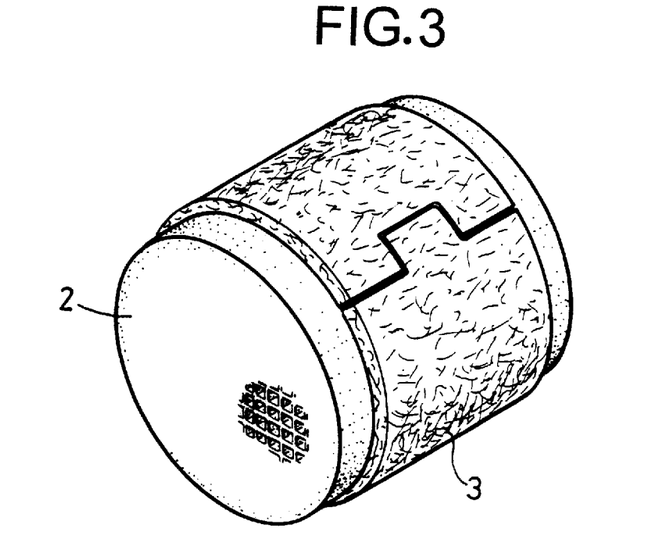
FIG. 3 is a perspective view of a catalytic carrier with a retaining mat wound therearound.

FIGS. 1 to 3 show a catalytic converter 1 according to a first embodiment of the present invention. The catalytic converter 1 includes a cylindrical catalyst carrier 2 on which a catalyst is carried therein, a retaining mat 3 wound around an outer peripheral surface of the catalyst carrier 2, and a casing 5 having a cylindrical carrier-retaining portion 4 for retaining the catalyst carrier 2 with the retaining mat 3 compressed.

The catalyst carrier 2 is of a honeycomb structure and has a true circular cross-section. The retaining mat 3 is made by binding a mixture of a ceramic fiber and a vermiculite by a binder. The catalyst carrier 2 and the retaining mat 3 are well-known.

The casing 5 is made from a steel plate and has truncated-conical connecting portions 6 integrally provided at opposite ends of the cylindrical carrier retaining portion 4. The connecting portions 6 are adapted to be connected to an exhaust pipe.

The cylindrical carrier retaining portion 4 is an assembly which includes two diametrically split halves $4_1$ and $4_2$ whose opposite side edges $7_1$ and $7_2$ are fitted over each other with fitted portions bonded to each other through weld zones 9. The opposite side edges $7_1$ and $7_2$ include inner and outer portions c, respectively, which are bents outwards from an arcuate half main portion b, and a flat portion d connected to the folded portion c and extending in a tangent direction. A catalytic converter mounting flange e is connected to the outer bent portion c.

Each of the truncated-conical connecting portions 6 includes a pair of halves $6_1$ and $6_2$ connected to the halves $4_1$ and $4_2$ of the cylindrical carrier retaining portion 4, and has an assembled structure similar to that of the carrier retaining portion 4.

In the first embodiment, the cylindrical carrier retaining portion 4 has an oval cross-section in which a length between both the fitted portions 8 is major axis a.

If a circumferentially bisecting position in each of the halves $4_1$ and $4_2$ is defined as a 0° position; positions spaced apart from the 0° position through 30° and 60° about the center g of the catalyst carrier 2 are defined as a 30° position and a 60° position, respectively; and if distances between an inner peripheral surface of the carrier retaining portion 4 and the center g at the 0° position, the 30° position and the 60° position are represented by $R_{0-1}$, $R_{30-1}$ and $R_{60-1}$, respectively, a relation, $R_{0-1} < R_{30-1} < R_{60-1}$ is established.

At a 90° position, an urging force applied to the retaining mat 3 in a direction toward the center g of the catalyst carrier by the cylindrical carrier retaining portion 4 is approximately zero and hence, the surface pressure on the catalyst carrier 2 is approximately zero. Therefore, the distance at the 90° position presents no problem. The same can be said for other embodiments which will be described hereinafter.

Figure 4:
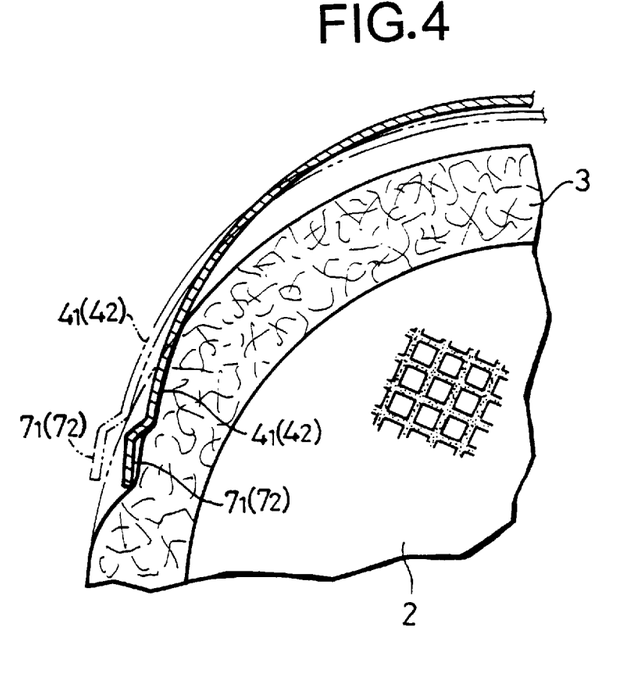
FIG. 4 is a view illustrating the relation between a half, the retaining mat and the catalyst carrier in an operation for fitting halves over each other.

If the cross-sectional shape of the cylindrical carrier retaining portion 4 is specified as described above, namely, such that the relation, $R_{0-1} < R_{30-1} < R_{60-1}$ is established, the distance between the opposite-side edges $7_1$ and $7_2$ of the halves $4_1$ and $4_2$ can be increased, and the inner peripheral surfaces of the halves $4_1$ and $4_2$ can be made smooth, as shown in exaggeration by a two-dot dashed line in FIG. 4. Therefore, in the course of clamping the catalyst carrier 2 by both the halves $4_1$ and $4_2$, the degree in which opposite-side edges $7_1$ and $7_2$ of the halves $4_1$ and $4_2$ bite into the outer peripheral surface of the retaining mat 3 can be decreased further, and the frictional force of the inner peripheral surface of the halves $4_1$ and $4_2$ to the outer peripheral surface of the retaining mat 3 can be decreased more than when the each of the halves $4_1$ and $4_2$ has an arcuate inner peripheral surface shown by a solid line, thereby moderating the drawing force applied to the retaining mat 3.

As a result, the density of the retaining mat 3 after being compressed is greater at the circumferentially bisecting position in each half than that in the prior art, and is varied in an increased manner in accordance with a decreasing variation of the urging force over an area extending from the circumferentially bisecting position f to both the fitted portions 8 so as to provide compensation.

Thus, the non-uniform degree of the surface pressure on the catalyst carrier in the circumferential direction thereof can be decreased, and the retaining force applied to the catalyst carrier 2 by the cylindrical carrier retaining portion 4 can be increased.

Figure 5:
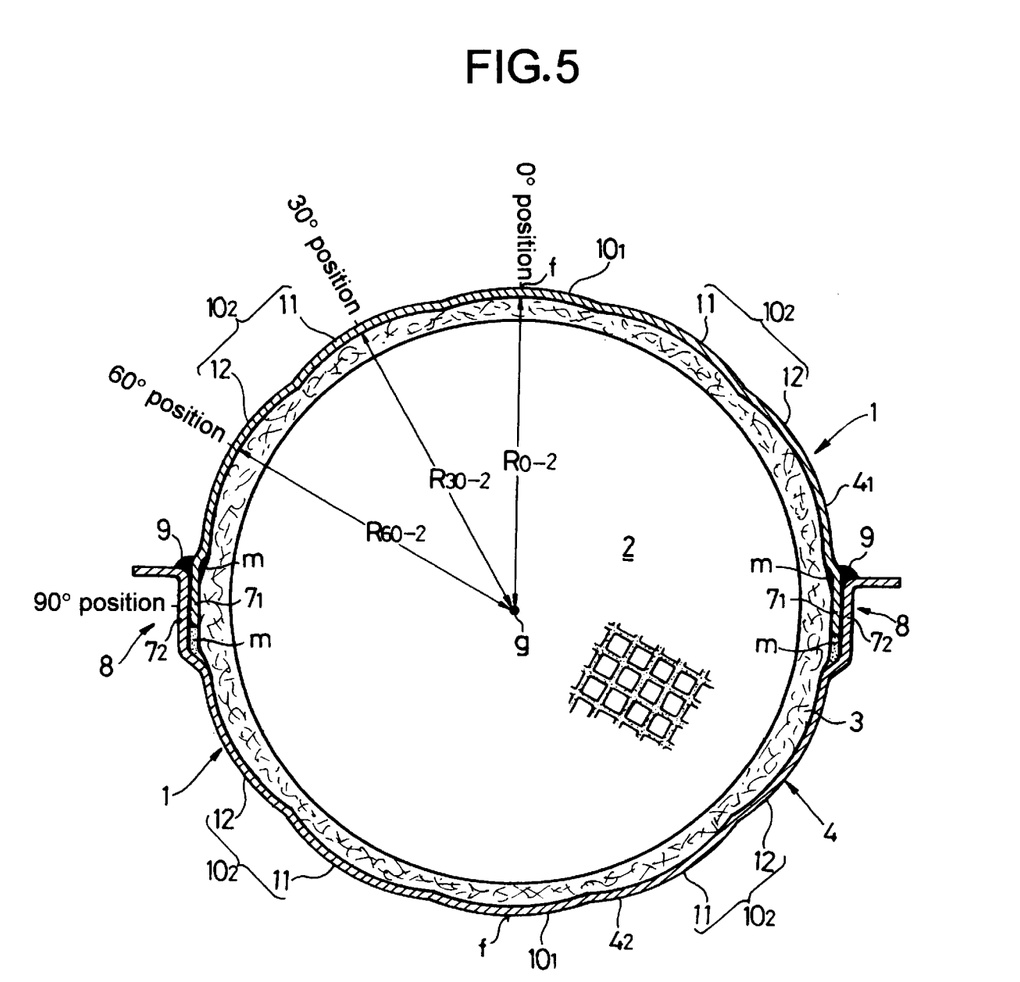
FIG. 5 corresponds to FIG. 2, and is a cross-sectional view of a catalytic converter according to a second embodiment of the invention.

FIG. 5 shows a second embodiment of the catalytic converter 1. In the second embodiment, each of halves $4_1$ and $4_2$ forming a cylindrical carrier retaining portion 4 includes a first constructing section $10_1$ which includes a circumferentially bisecting position f between opposite-side edges $7_1$ and $7_2$ and a single circular arc, and a pair of second constructing sections $10_2$ which lie between opposite ends of the first constructing section $10_1$ and the opposite-side edges $7_1$ and $7_2$ each section $10_2$ having two circular arcs bulging radially outwards a larger extent than the first constructing section $10_1$, i.e., having their crest portions distanced farther from the outer peripheral portion of the catalyst carrier 2 than that of the section $10_1$.

In this case, the second constructing section 102 includes a shorter arcuate portion 11 including a 30° position spaced apart through 30° from a 0° position (which is provided by the circumferentially bisecting position f in each of the halves $4_1$ and $4_2$) about the center g of the catalyst carrier 2, and a longer arcuate portion 12 including a 60° position likewise spaced apart through 60° from the 0° position.

If the distances between the inner peripheral surface of the cylindrical carrier retaining portion 4 and the center g of the catalyst carrier 2 at the 0°, 30° and 60° positions are represented by $R_{0-2}$, $R_{30-2}$ and $R_{60-2}$, respectively, a relation, $R_{0-2} < R_{30-2} < R_{60-2}$, is established. The degree in which the longer arcuate portion 12 bulgers radially outwards is greater than that of the shorter arcuate portion 11. Further, if the second embodiment is compared with the first embodiment, the following relationships are established: $R_{0-2} = R_{0-1}$, $R_{30-2} > R_{30-1}$, and $R_{60-2} > R_{60-1}$.

If the shape of each of the halves $4_1$ and $4_2$ is specified as described above, the frictional force of the inner peripheral surface of each of the second constructing section $10_2$ on the outer peripheral surface of the retaining mat 3 can be further decreased and the drawing force applied to the retaining mat 4 can be moderated further, in the course of clamping the catalyst carrier 2 by both the halves $4_1$ and $4_2$. In addition, the longer arcuate portion 12 of each of the second constructing sections $10_2$ is located in an area where the amount of the retaining mat is increased due to such drawing force and hence, such an increment portion can be contained in the longer arcuate portion 12.

As a result, the density of the retaining mat 3 after being compressed is greater at the circumferentially bisecting position in each half than that in the prior art, and is varied in an increased manner in accordance with a decreasing variation in urging force between from the circumferentially bisecting position f to both the fitted portions 8 so as to provide sufficient compensation. Thus, the non-uniform degree of the surface pressure on the catalyst carrier 2 in the circumferential direction thereof can be further decreased, and the retaining force applied to the catalyst carrier 2 by the cylindrical carrier retaining portion 4 can be further increased.

Figure 6:
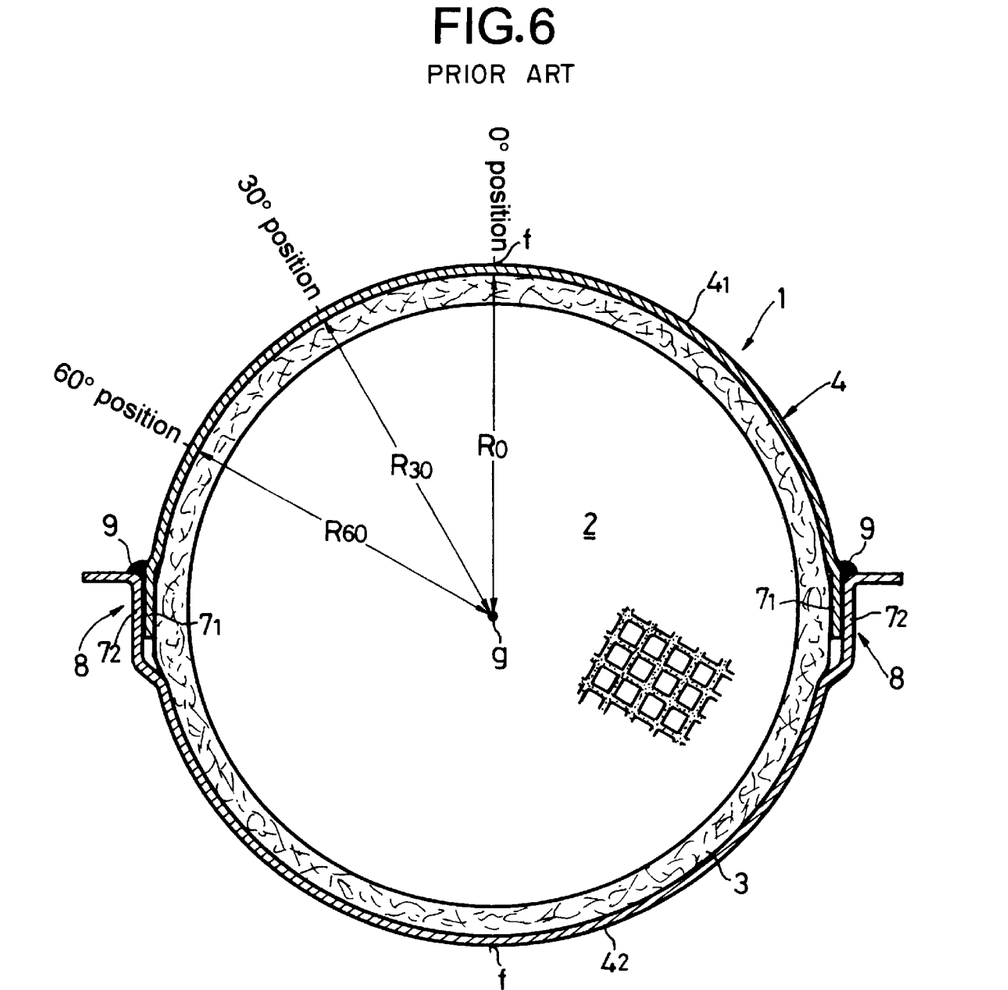
FIG. 6 corresponds to FIG. 2, and is a cross-sectional view of the prior art catalytic converter.

FIG. 6 shows the prior art catalytic converter 1. The catalytic converter 1 has a cylindrical carrier retaining portion 4 which has a true circular cross-section (in this case, the shape of the fitted portions 8 is disregarded). Therefore, if the distances between the inner peripheral surface of the cylindrical carrier retaining portion 4 and the center g of the catalyst carrier 2 at 0°, 30° and 60° positions are represented by $R_0$, $R_{30}$ and $R_{60}$, a relation, $R_0 = R_{30} = R_{60}$ is established. If this prior art catalytic converter 1 is compared with the first embodiment, the following relationships are established: $R_0 = R_{0-1}$, $R_{30} < R_{30-1}$, and $R_{60} < R_{60-1}$.

Figure 7:
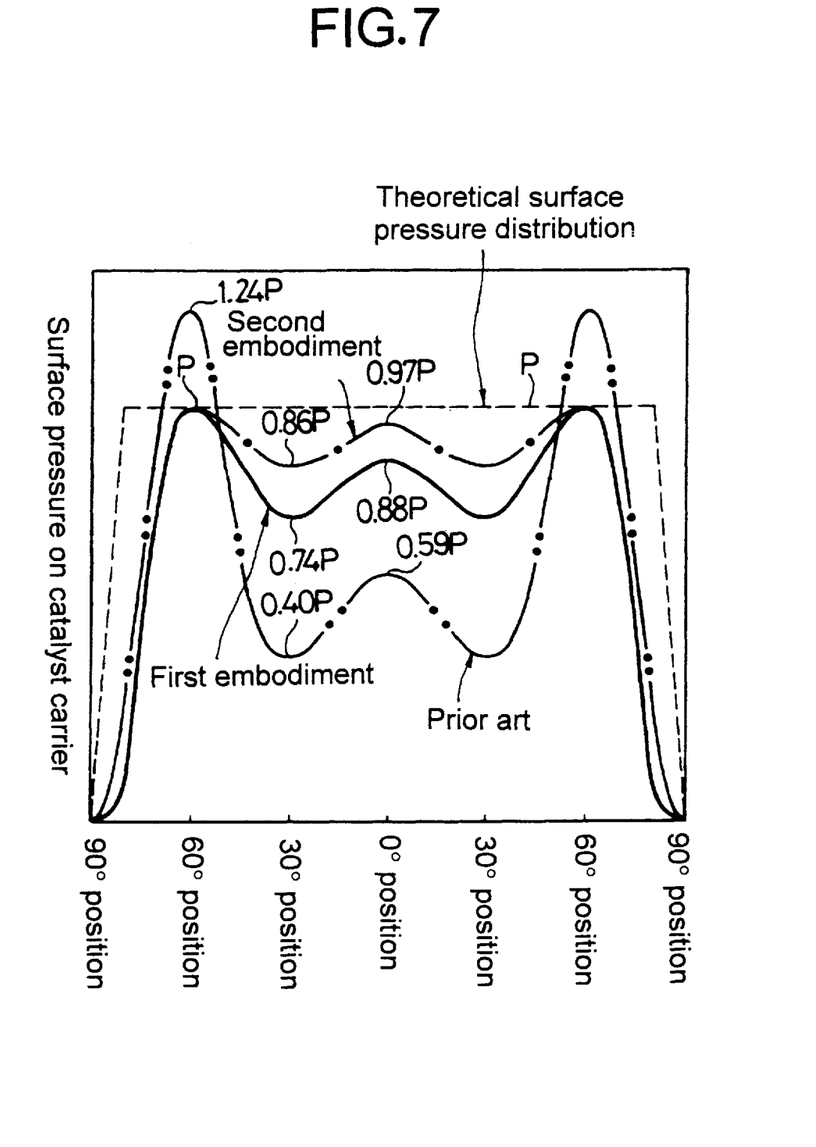
FIG. 7 is a diagram illustrating the surface pressure on the catalyst carrier.

FIG. 7 shows the surface pressure distributions in the semi-peripheral portion of the catalyst carrier in the first embodiment shown in FIG. 2, the second embodiment shown in FIG. 5 and the prior art shown in FIG. 6. A dashed line in FIG. 7 corresponds to a theoretical surface pressure distribution. In this theoretical surface pressure distribution, the surface pressure has a constant value P from the 0° position to near a 80° position; is sharply lowered after passing the 80° position for the reason of the structure of the cylindrical carrier retaining portion 4, and is of approximately zero at a 90° position.

Details of each of the cases will be described below:

(a) In the case of the prior art shown by a two-dot dashed line:

Notwithstanding that the urging force provided in the direction toward the center g of the cylindrical carrier retaining portion 4 is largest at the 0° position, the density of the retaining mat 3 after being compressed is extremely low at this 0° position and hence, the surface pressure is on the order of about 0.59 P.

At the 30° position, the urging force is slightly decreased as compared with that at 0° position. On the other hand, the density of the retaining mat 3 at the 30° position is slightly higher than that at the 0° position, but the compensation provided to the decreasing variation of the urging force by the increase in density is low and hence, the surface pressure at the 30° position is less than that at the 0° position and on the order of 0.40 P.

At the 60° position, the urging force is slightly decreased as compared with that at the 30° position. On the other hand, the density of the retaining mat 3 is extremely high as compared with that at the 30° position and hence, the compensation provided to the decreasing variation of the urging force by the increase in density is too high, and the surface pressure is raised to about 1.24 P, which is at least twice that at the 0° position.

(b) In the case of the first embodiment shown by a solid line:

At the 0° position, the density of the retaining mat 3 is greater than that in the prior art and hence, the surface pressure assumes a raised value which is greater than that in the prior art and which is on the order of 0.88 P.

At the 30° position, the density of the retaining mat 3 is higher than that in the prior art, whereby the compensation provided by the increase in density to the decreasing variation of the urging force is enhanced and hence, the surface pressure is greater than that in the prior art and is on the order of 0.74 P.

At the 60° position, the density of the retaining mat 3 is less than that in the prior art and hence, the compensation provided by the increase in density to the decreasing variation of the urging force is reduced, whereby the surface pressure assumes a lowered value which is on the order of P.

(c) In the case of the second embodiment shown by a one-dot dashed line:

At the 0° position, the density of the retaining mat 3 is greater than that in the first embodiment and hence, the surface pressure assumes a raised value greater than that in the first embodiment and which is on the order of 0.97 P.

At the 30° position, the density of the retaining mat 3 is greater than that in the first embodiment, whereby the compensation provided by the increase in density to the decreasing variation of the urging force is enhanced and hence, the surface pressure is greater than that in the first embodiment and is on the order of 0.74 P.

At the 60° position, the density of the retaining mat 3 is equal to that in the first embodiment and hence, the compensation provided by the increase in density to the decreasing variation of the urging force is equivalent to that in the first embodiment, whereby the surface is on the order of P, as in the first embodiment.

As is apparent from the above results, according to the first and second embodiments, the non-uniform degree of the surface pressure on the catalyst carrier 2 is substantially decreased as compared with the prior art, whereby the surface pressure distribution can be established to approximate the theoretic surface pressure distribution.

Figure 8:
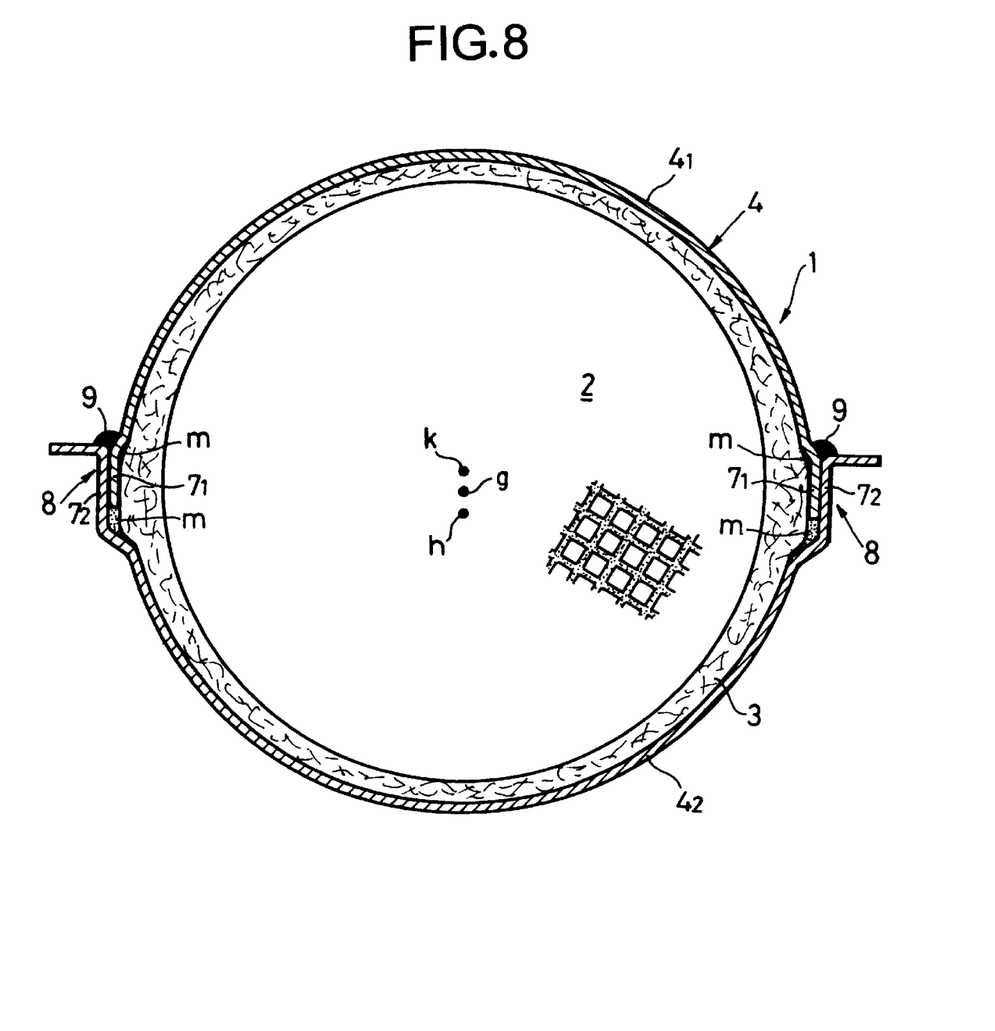
FIG. 8 corresponds to FIG. 2, and is a cross-sectional view of a catalytic converter according to a third embodiment of the invention.

FIG. 8 shows a third embodiment of a catalytic converter 1. In a cylindrical carrier retaining portion 4 in the third embodiment, the center h of one of halves 4₁ is shifted more toward the other half 4₂ than the center g of the catalyst carrier 2, and the center k of the other half 4₂ is shifted more toward the one half 4₁ than the center g of the catalyst carrier 2, whereby an oval cross-sectional shape is realized in the cylindrical carrier retaining portion 4.

The surface pressure distribution on the catalyst carrier 2 in the third embodiment is substantially the same as in the first embodiment.

Figure 9:
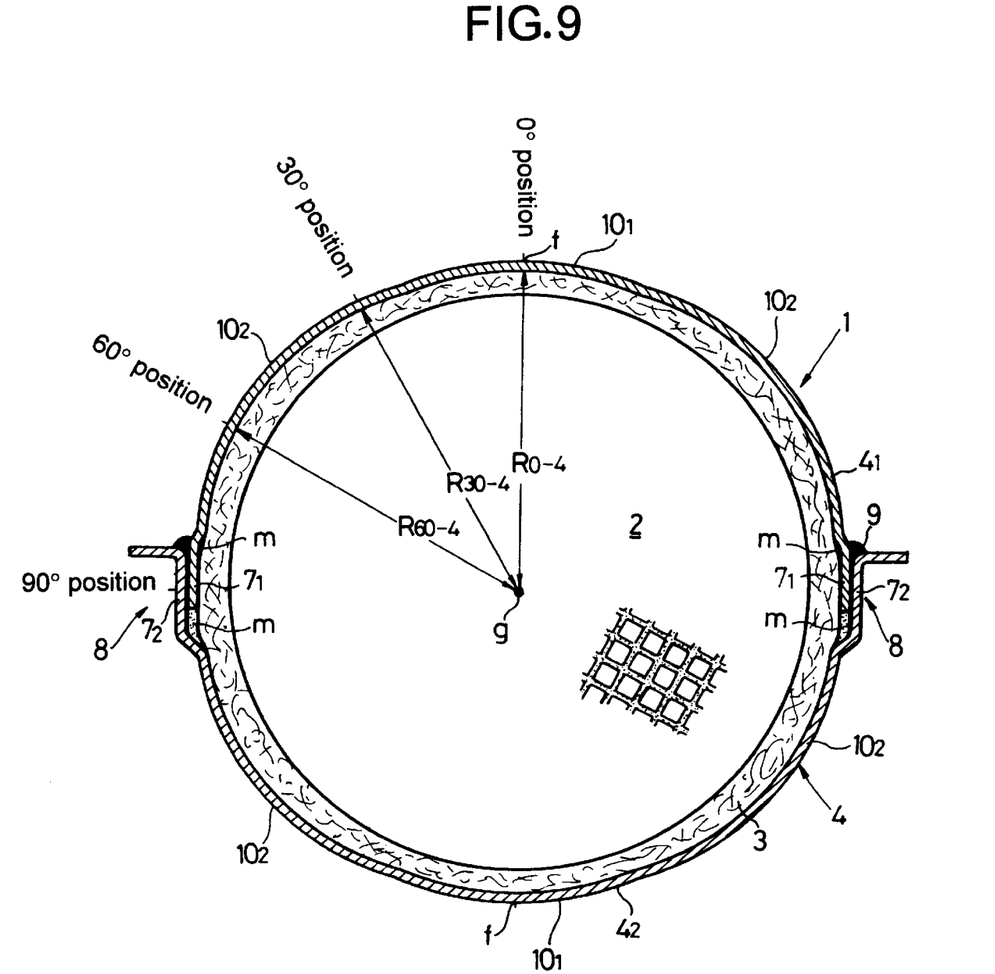
FIG. 9 corresponds to FIG. 2, and is a cross-sectional view of a catalytic converter according to a fourth embodiment of the invention.

FIG. 9 shows a fourth embodiment of a catalytic converter 1. In the fourth embodiment, each of halves 4₁ and 4₂ constituting a cylindrical carrier retaining portion 4 includes a first constructing section 10₁ which includes a circumferentially bisecting position f in each of the halves 4₁ and 4₂ between opposite-side edges 7₁ and 7₂ and has a single circular arc, and a pair of second constructing sections 10₂ which lie between opposite ends of the first constructing section 10₁ and the opposite-side edges 7₁ and 7₂ and each of which has a single circular arc bulging radially outwards to a larger extent than the first constructing section 10₁, i.e., having a crest portion distanced farther from the outer peripheral portion of the catalyst carrier 2 than that of the section 10₁.

In this case, if the circumferentially bisecting position f in each of the halves 4₁ and 4₂ is defined as a 0° position, the second constructing section 10₂ includes 30° and 60° positions spaced apart through 30° and 60° from the 0° position about the center g of the catalyst carrier 2.

In other words, the distance between the outer peripheral surface of the catalytic carrier 2 and the inner peripheral surface of each the halves 4₁, 4₂ of the cylindrical carrier retaining portion 4 is determined to be the smallest at a middle portion of the half 4₁, 4₂ between its opposite-side edges 7₁, 7₂ and such that the distance between the cylindrical carrier retaining portion 4 and the catalytic carrier 2 gradually increases from the middle portion of each of the split halves 4₁, 4₂ toward the opposite-side edges 7₁, 7₂ thereof.

If the distances between the inner peripheral surface of the cylindrical carrier retaining portion 4 and the center g of the catalyst carrier 2 at the 0°, 30° and 60° positions are represented by $R_{0-4}$, $R_{30-4}$ and $R_{60-4}$, a relation, $R_{0-4} < R_{30-4} < R_{60-4}$ is established. Further, if the third embodiment is compared with the first and second embodiments, the following relationships are established: $R_{0-4} = R_{0-1} = R_{0-2}$, $R_{30-1} < R_{30-4} < R_{30-2}$, and $R_{60-1} < R_{60-4} < R_{60-2}$.

The surface pressure distribution on the catalyst carrier 2 in the fourth embodiment lies substantially in the middle between those in the first and second embodiments from the 0° position to the 60° position in FIG. 7.

At the fitted portions 8 of the cylindrical carrier retaining portion 4₁ the urging force provided to the retaining mat 3 in the direction toward the center g of the catalyst carrier is approximately zero and hence, there is a possibility that a gap may be produced between each of the inner surfaces of the fitted portions 8 and the outer peripheral surface of the retaining mat 3 to constitute a bypass for an exhaust gas.

To avoid this, prior to fitting the halves 4₁ and 4₂ together, a ceramic-type bond m may be previously applied onto inner surfaces of the opposite-side edges 7₁ and 7₂ of the halves 4₁ and 4₂, so that the gap may be filled with the bond m.

In the first and third embodiments shown in FIGS. 2 and 8, when the halves 4₁ and 4₂ of the cylindrical carrier retaining portion 4 and the halves 6₁ and 6₂ of the truncated-conical connecting portion 6 are formed into one body by pressing, the opening 13 in the connecting portion 6 is formed into an oval shape, but is corrected to a true circle after welding of the halves 6₁ and 6₂ to each other.

Further, the cylindrical carrier retaining portion 4 and the truncated-conical connecting portion 6 may be fabricated separately and then integrally bonded to each other using a means such as welding.

What is claimed is:

1. A catalytic converter comprising:

cylindrical catalyst carrier having a catalyst carried therein;

a retaining mat wound around an outer peripheral surface of said catalyst carrier; and a casing including a cylindrical carrier retaining portion for retaining said catalyst carrier which compressing said retaining mat between an inner peripheral surface of said cylindrical carrier retaining portion and the outer peripheral surface of said catalyst carrier that is distanced from said inner peripheral surface of said cylindrical carrier retaining portion, said cylindrical carrier retaining portion being an assembly which is comprised of diametrically split halves having axially extending opposite-sidle edges fitted over each other with fitted portions thereof bonded to each other, wherein said cylindrical carrier retaining portion has a cross-section of an oval shape in which a length between both said fitted portions is the longest diameter, wherein a distance between the outer peripheral surface of said catalyst carrier and the inner peripheral surface of each said halves of the cylindrical carrier retaining portion is determined to be the smallest at a middle portion of the half between its opposite side edges and such that said distance between said cylindrical carrier retaining portion and said catalyst carrier gradually increases from said middle portion of each of said split halves toward said opposite side edges thereof.

2. A catalytic converter comprising:

a cylindrical catalyst carrier having a catalyst carried therein;

a retaining mat wound around an outer peripheral surface of said catalyst carrier; and a casing including a cylindrical carrier retaining portion for retaining said catalyst carrier while compressing said retaining mat between an inner peripheral surface of said cylindrical carrier retaining portion and the outer peripheral surface of said catalyst carrier that is distanced from said inner peripheral surface of said cylindrical carrier retaining portion, said cylindrical carrier retaining portion being an assembly which is comprised of diametrically split halves having axially extending opposite-side edges fitted over each other with fitted portions thereof bonded to each other, wherein each of said halves includes a first constructing section which includes a circumferentially bisecting position between said opposite-side edges and has a single circular arc bulging radially outwardly, and a pair of second constructing sections each of which lies between one of opposite ends of said first constructing section and one of said opposite-side edges, wherein each said second constructing section has an arcuate portion which bulges radially outwardly from the outer peripheral surface of said catalyst carrier defining a crest portion and lowered opposite ends and is connected at one of said lowered opposite ends to said one of said opposite-side edges, a distance between the outer peripheral surface of said catalyst carrier and said crest portion of said arcuate portion of said second constructing section being determined to be larger than a distance between the outer peripheral surface of said catalyst carrier and a crest portion of said first constructing section.

3. A catalytic converter according to claim 2, wherein said opposite-side edges of each of said halves of the cylindrical carrier retaining portion are raised radially outwardly and each said raised opposite-side edge is connected to said one of the lowered opposite edges of the second constructing section via a step.

4. A catalytic converter comprising:

a cylindrical catalyst carrier having a cross-section of a circular shape and having a catalyst carried therein, a retaining mat wound around an outer peripheral surface of said catalyst carrier; and a casing including a cylindrical carrier retaining portion for retaining said catalyst carrier while compressing said retaining mat between an inner peripheral surface of said cylindrical carrier retaining portion and the outer peripheral surface of said catalyst carrier that is distanced from said inner peripheral surface of said cylindrical carrier retaining portion, said cylindrical carrier retaining portion being an assembly which is comprised of diametrically split halves having axially extending opposite-side edges fitted over each other with fitted portions thereof bonded to each other, wherein said cylindrical carrier retaining portion has a cross-section of an oval shape in which a length between both said fitted portions is the longest diameter, wherein a distance between the outer peripheral surface of said catalyst carrier and an inner peripheral surface of each said halves of the cylindrical carrier retaining portion is determined to be the smallest at a middle portion of the half between its opposite side edges and such that a distance between said cylindrical carrier retaining portion and said catalyst carrier gradually increases from said middle portion of each of said split halves toward said opposite side edges thereof.

5. A catalytic converter comprising:

a cylindrical catalyst carrier having a cross-section of a circular shape and having a catalyst carried therein, a retaining mat wound around an outer peripheral surface of said catalyst carrier, and a casing including a cylindrical carrier retaining portion for retaining said catalyst carrier while compressing said retaining mat between an inner peripheral surface of said cylindrical carrier retaining portion and the outer peripheral surface of said catalyst carrier that is distanced from said inner peripheral surface of said cylindrical carrier retaining portion, said cylindrical carrier retaining portion being an assembly which is comprised of diametrically split halves having axially extending opposite-side edges fitted over each other with fitted portions thereof bonded to each other, wherein each of said halves includes a first constructing section which includes a circumferentially bisecting position between said opposite-side edges and has a single circular arc bulging radially outwardly, and a pair of second constructing sections each of which lies between one of opposite ends of said first constructing section and one of said opposite-side edges, wherein each said second constructing section has an arcuate portion which bulges radially outwardly from the outer peripheral surface of said catalyst carrier defining a crest portion and lowered opposite ends and is connected at one of said lowered opposite edges to said one of said opposite-side edges, a distance between the outer peripheral surface of said catalyst carrier and said crest portion of said arcuate portion of said second constructing section being determined to be larger than a distance between the outer peripheral surface of said catalyst carrier and a crest portion of said first constructing section.

6. A catalytic converter according to claim 5, wherein said opposite-side edges of each of said halves of the cylindrical carrier retaining portion are raised radially outwardly and each said raised opposite-side edge is connected to said one of the lowered opposite edges of the second constructing section via a step.

* * * * *